United States Patent [19]

Doe et al.

[11] 3,918,481

[45] Nov. 11, 1975

[54] GAS SUPPLY APPARATUS

[75] Inventors: Ernest Edward Doe, Chesterfield; David Cowlishaw, Ranby, both of England

[73] Assignee: The Bryan Donkin Company Limited, Chesterfield, England

[22] Filed: Aug. 26, 1974

[21] Appl. No.: 500,355

[30] Foreign Application Priority Data

July 16, 1974  United Kingdom............... 31521/74

[52] U.S. Cl. ................................. 137/504; 138/45
[51] Int. Cl.² .......................................... F16K 21/02
[58] Field of Search ...... 137/501, 504, 480; 138/45; 251/118

[56] References Cited
UNITED STATES PATENTS

| | | | |
|---|---|---|---|
| 780,986 | 1/1905 | Francis | 137/504 |
| 2,198,487 | 4/1940 | Sisk | 137/504 |
| 3,023,591 | 3/1962 | Tilney | 137/504 X |
| 3,431,944 | 3/1969 | Sukuma | 138/45 |
| 3,503,417 | 3/1970 | Toda et al | 137/504 X |

*Primary Examiner*—Martin P. Schwadron
*Assistant Examiner*—Robert J. Miller
*Attorney, Agent, or Firm*—Browdy and Neimark

[57] ABSTRACT

A flow limiting device comprising a valve member located in a bore for movement in response to variations in the rate of flow of a gas through the bore and a spring acting to urge the valve assembly away from a valve seat, the valve assembly including a valve head and a washer abutting against a downstream side of the valve head, there being a slot formed at the abutting surfaces of the valve head and washer so that, when the valve assembly has closed upon its seat in response to an excessive pressure drop across the device a pre-determinedly small quantity of gas is allowed to flow through the device by way of the slot. A peripheral skirt portion of the valve head may surround the washer so that, until the valve assembly closes onto its seat, the skirt portion tends to inhibit the flow of gas along the slot so that it is kept free of dust and other inclusions in the gas.

4 Claims, 2 Drawing Figures

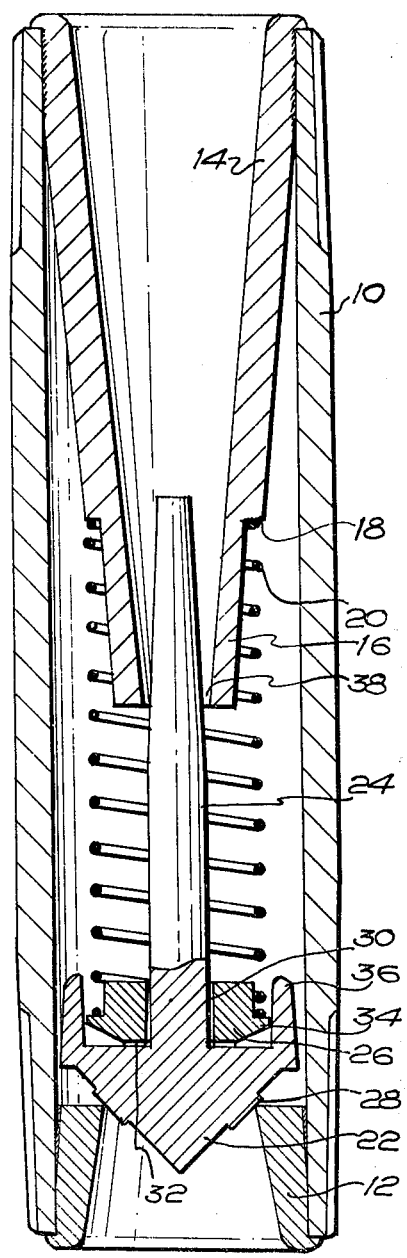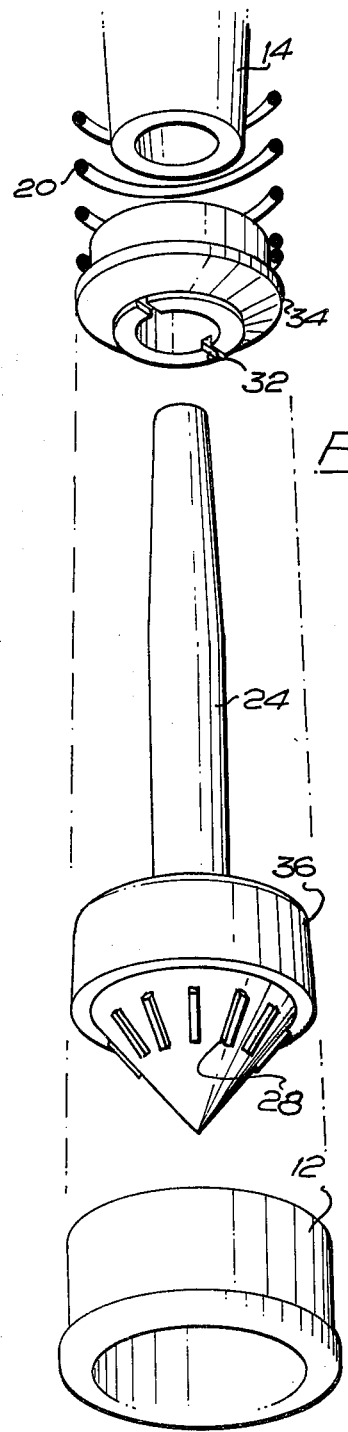

GAS SUPPLY APPARATUS

The invention relates to gas supply apparatus and has for its object to provide an improvement therein.

There are circumstances in which when a fault develops in a gas supply line, either to commercial or domestic premises, it is desirable to limit the further supply of gas. For example, if excavation work causes a major tear to develop in the gas supply line which would otherwise allow a massive and dangerous quantity of gas to escape to atmosphere it is desirable that the supply should be immediately and automatically restricted. A complete shut-off of gas would make recommissioning of the repaired line difficult and so it is desirable that the flow limiting means does not completely cut-off the flow of gas but cuts down the flow to a very small controlled residual flow.

According to the invention, there is provided a flow limiting device for fitment in a gas supply line, the device including a body part with a bore extending therethrough, a movable valve assembly located in said bore with radial clearance for the flow of gas around it, and spring means acting to urge the valve assembly away from a valve seat, the valve assembly including a valve head and a special washer abutting against the downstream side of the valve head, at least one slot being formed at the abutting surfaces of the valve head and special washer so that, when the valve assembly has closed upon said seat in response to an excessive pressure drop across the device brought about by some fault condition, a predeterminedly small quantity of gas is allowed to flow through the device by way of said slot or slots formed at the abutting surfaces of the valve head and special washer. A peripheral skirt portion of the valve head will preferably surround the washer, the arrangement being such that until the valve assembly closes onto its seat said skirt portion tends to inhibit the flow of gas along the slot or slots formed at the abutting surfaces of the valve head and washer so that said slot or slots will be kept free of dust and other inclusions in the gas. The valve head will preferably be provided with a stem extending through the bore of an insert at the downstream end of the device, at least one of the stem and insert bore being of tapered form so that the flow of gas through said bore is dependent upon the axial position of the valve stem within said insert bore, the spring means referred to acting to increase the flow of gas through the insert bore and the characteristics of said spring means and the characteristics of the valve stem movable in said insert bore being carefully related so that whatever the pressure drop across the device the quantity of gas allowed to pass through the device is limited to a substantially constant maximum. The upstream end of the insert will preferably form the valve seat referred to above. The upstream end of the valve head will preferably be of streamline form and will preferably be provided with a plurality of flutes which normally engage an abutment surface constituted by one end of an insert at the upstream end of the device.

In order that the invention may be fully understood and readily carried into effect, the same will now be described, by way of example only, with reference to the accompanying drawings, of which:

FIG. 1 is a longitudinal section through a flow limiting device embodying the invention, and FIG. 2 is an exploded view of the device.

Referring now to the drawings, the flow limiting device there illustrated includes a body part 18 screwthreaded at both ends (for easy installation in a gas supply line) and having respective inserts 12 and 14, both of which are made of a synthetic plastics material, secured by an adhesive in its opposite ends. Both of the inserts have tapered bores, as shown, and the insert 14 has an axially extending spigot portion 16 at what is its upstream end. An annular shoulder 18 is formed at the root end of said spigot portion and constitutes a seating surface for a coil compression spring 20.

The spring 20 acts against a movable valve assembly which comprises a valve head 22 and integral stem 24 and a special washer 26 which encircles the stem and abuts against the valve head. The valve head, an end face of which is of streamline form as shown, is provided with a plurality of flutes 28 which normally engage an abutment constituted by one end of the insert 12, and the arrangement is such that a normal flow of gas is allowed through the device even when the fluted surface of the valve head engages the seating, the normal flow taking place between the flutes 28 and through the annular space between the periphery of the valve head and the wall of the body part.

The special washer 26 has a bore which when it encircles the stem 24 forms a narrow annular space 30 surrounding the root end of the stem. In addition, it will be seen that the face of the washer which abuts against the valve head is provided with a transverse slot 32, and a circumferential flange 34 which surrounds the washer provides a seating surface for the coil spring 20. A peripheral skirt portion 36 of the valve head surrounds the washer 26, but there is a narrow annular space between the inside diameter of said skirt portion and the periphery of the flange portion of the washer.

The stem 24 which is formed integrally with the valve head is of tapering form as shown and extends through the upstream end of the insert 14. When the movable valve assembly is in the normal position in which it is shown in FIG. 1 there is an annular space 38 between the surface of the stem and the inside surface of the insert 14 at the upstream end of the latter (and this space is sufficient to allow the normal rate of flow of gas through the device without any appreciable pressure drop across the device; the gradually diffused flow of gas as it passes along the insert 14 to the downstream end of the device assists in reducing the pressure drop across the device to a minimum).

The arrangement is such that if an excessive quantity of gas begins to pass through the device, due perhaps to a regulator with which the device is associated having suffered a major fault, the valve head 22 is displaced from its seat and a relatively smaller clearance is formed around the stem 24 at the upstream end of the insert 14. This has the effect of limiting the flow of gas through the device so that whatever the pressure drop across the device the quantity of gas allowed to pass through the device is limited to a substantially constant maximum (the characteristics of the spring and the characteristics of the valve member movable in the device having been carefully related to achieve this result).

If the flow should be somewhat higher as when the device is used in a high pressure service main and the main is fractured downstream of the device, for example by the excavation damage referred to previously, the valve assembly will immediately be displaced to such an extent that the washer 26 abuts against the upstream end of the insert 14. In this case a predeterminedly small quantity of gas can then flow through the device by way of the annular space surrounding the washer and through the slot 32 and through the annular space 30 surrounding the root end of the stem.

It will be understood that the normal flow of gas through the device is such that the slot 32 and the annular space 30 (through which the reduced quantity of gas flows only when a fault condition has arisen) remain free from blockage by dust and other inclusions in the gas. Consequently, the device can be expected to be inherently reliable even when it has been installed in a gas supply line for an extended period of time without a fault condition having previously arisen. It will also be understood that when the fault condition has been corrected the flow limiting device returns to normal condition automatically and consequently when it has been installed in a gas supply line it needs no further attention. It has been found that the device is not affected by vibrations and other external influences and consequently it is superior to flow limiting devices which for example include magnetic means for holding a valve member in a normal position.

Various modifications could of course be made without departing from the scope of the invention. For example, the stem part 24 need not necessarily be formed integrally with the valve head 22.

What we claim and desire to secure by Letters Patent is:

1. A flow limiting device for fitment in a gas supply line comprising:
   a body part having a bore extending therethrough;
   a valve seat formed within said bore;
   a valve assembly located in said bore, said assembly moving axially in said bore in response to variations in the rate of flow of gas through said bore, said valve assembly including a valve head having an upstream end and a downstream end, a stem connected to said valve head, and a washer encircling said stem and abutting against said downstream end of said valve head, said valve head further including a peripheral skirt portion surrounding said washer, and wherein at least one generally radially extending slot is formed at the abutting surfaces of said valve head and said washer; and
   spring means surrounding a portion of said valve assembly for acting in opposition to the direction of flow of gas through said bore, said spring means acting to urge said valve assembly away from said valve seat;
   whereby the radially outer end of said at least one slot it shrouded by said peripheral skirt portion of said valve head, the arrangement being such that during normal flow of gas through the device said spring means prevents said valve head and said washer from contacting said valve seat so that the flow of gas is unimpeded, and during an excessive flow of gas said valve assembly is displaced against the force of said spring means causing said washer to abut against said valve seat, and wherein a predeterminedly small quantity of gas is allowed to flow through the device by way of said at least one slot formed at the abutting surfaces of said valve head and said washer, said at least one slot tending to remain free of dust and other inclusions in the gas during normal flow by the fact that the gas is not caused to flow through said at least one slot during normal flow since said at least one slot is shrouded by said peripheral skirt portion of said valve head.

2. A flow limiting device according to claim 1, wherein at least one said stem and said bore being of tapered form so that the flow of gas through said bore is dependent upon the axial position of the valve stem within said insert bore, said spring means acting to increase the flow of gas through the insert bore and the characteristics of said spring means and the characteristics of said valve stem movable in said bore being carefully related so that whatever the pressure drop across the device, the quantity of gas allowed to pass through the device is limited to a substantially constant maximum.

3. A flow limiting device according to claim 2, in which the upstream end of the insert forms the valve seat.

4. A flow limiting device according to claim 1, in which said upstream end of said valve head is of streamline form and is provided with a plurality of flutes which normally engage an abutment surface constituted by one end of an insert at the upstream end of the device.

* * * * *